July 17, 1962

A. K. LITTWIN 3,045,151

APPARATUS FOR AND METHOD OF DEMAGNETIZING

Filed Oct. 17, 1958

Inventor
Arthur K. Littwin
By Horton, Davis,
Brewer & Bergman
Attys.

Inventor
Arthur K. Littwin
By Horton, Davis,
Brewer & Brugman
Attys

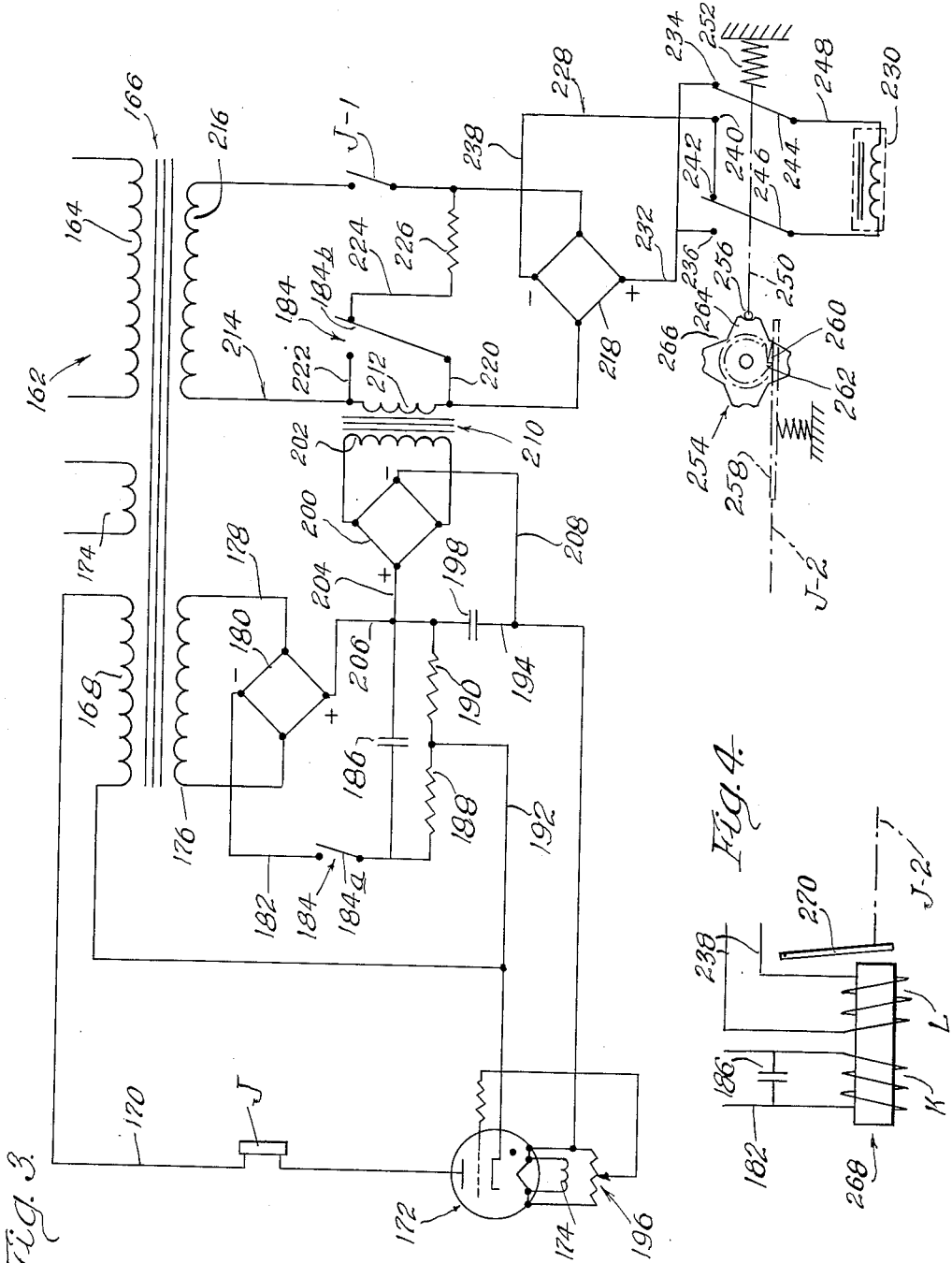

United States Patent Office 3,045,151
Patented July 17, 1962

3,045,151
APPARATUS FOR AND METHOD OF
DEMAGNETIZING
Arthur K. Littwin, Lincolnwood, Ill., assignor to Robert L. Littwin, Arthur K. Littwin, and Horace A. Young, Chicago, Ill., as trustees known as Littwin Family Trust No. 1
Filed Oct. 17, 1958, Ser. No. 767,820
16 Claims. (Cl. 317—157.5)

The present invention relates to apparatus for and method of demagnetizing an electromagnet.

The invention is particularly adapted to use in connection with demagnetizing a magnetic chuck of the kind commonly used in a machine tool for holding a piece being worked on by the tool. In the use of such a magnetic chuck, the work piece is placed thereon and the chuck is magnetized for holding it securely thereon in the work operation being performed on the piece, such as grinding, milling, etc. After the desired operation is completed, the chuck is de-energized, but a substantial amount of residual magnetism remains such as to render it difficult to remove the work piece, particularly in those cases where the chuck, or the work piece, or both, are large and massive. In order to facilitate removal of the work piece in such cases, the chuck and work piece are demagnetized through a series of steps utilizing reversed polarity current and successively lesser saturation levels in the successive steps, terminating in a final step at which the residual magnetism is at such a low level that the work piece can readily be removed from the chuck.

Several different apparatus and methods have heretofore been employed for the purpose, as will be referred to again hereinbelow, utilizing predetermined variation in time periods or voltage values for producing the desired decreases in residual magnetism, i.e., the variations were predetermined according to considerations other than the condition of the chuck and work piece involved in the particular demagnetizing operation.

The apparatus and method of the present invention, however, are effective for producing the variations in saturation levels in the magnetized object according to the characteristics of the object itself that is being demagnetized in the respective demagnetizing operation. More particularly, the magnetized object is demagnetized in a series of steps, and in each step the saturation level to be established is determined and controlled by the saturation level in the preceding step, as contra-distinguished from the previously known methods referred to above.

An important advantage of the present invention is that the steps in the demagnetizing operation are in all cases proportional to the condition of the object to be demagnetized. This is particularly advantageous in the case of an electromagnetic chuck where the work piece held thereon may and usually does vary in mass from one instance to the next. In the case of a chuck and work piece of great mass, the old method of demagnetizing may result in a final step of substantial residual magnetism, while in the use of the present invention, the residual magnetism at the final step is of the same fractional saturation level relative to the original full magnetism regardless of the mass of the chuck and work piece.

The present invention, in certain of its forms involves electronic controls, and in another form a similar control for effecting reversal of polarity and timing of intervals, produced by the condition of the object being demagnetized.

The specific forms of the invention disclosed herein include:

(a) A plurality of tubes, and interposition of resistances of respectively different values in the successive reversing steps;

(b) A plurality of tubes and the provision of voltages of respectively different values in the successive reversing steps, such as by tapping a source transformer at different voltage value points; and (c) A single tube and the provision of bias thereon of various values, as by means of condensers.

(d) Single control means utilizing counteracting electromagnetic means.

Other advantages and features of the invention will appear from the following detailed description taken in conjunction with the accompanying drawings in which:

FIG. 3 is a circuit diagram of a third form of the invention; and

FIG. 4 is a fragmentary diagram of a further embodiment related to that of FIG. 3.

Referring in detail to the demagnetizing apparatus and method of invention, and the specific forms thereof illustrated in the accompanying drawings, attention is directed to certain background matter having to do with demagnetizing. An early practical form of demagnetizing apparatus is that disclosed in U.S. Patent No. 2,229,104 issued January 21, 1941, to L. F. Littwin. The apparatus of this patent utilizes a series of resistors of progressively varying values in an arrangement in which the polarity of the current is reversed by a mechanical apparatus, and the direct current circuit is broken in the reversing operation. A later improvement is disclosed in my U.S. Patent No. 2,825,854 issued March 4, 1958. In the apparatus of the latter patent the alternating current is broken in a series of steps, and during the intervals in which the alternating current is broken, the direct current is reversed, and throughout the series of steps the saturation level of the electromagnet is progressively decreased as for example by utilizing decreased values of voltage in the successive steps. A third form of apparatus is that disclosed in my copending application Serial No. 681,412, filed August 30, 1957, now Patent No. 2,946,932, issued July 26, 1960, which utilizes an electronic control arrangement.

In all of the three foregoing inventions the demagnetizing operation is predetermined from considerations other than the characteristics of the objects being demagnetized in the respective operation, i.e., the progressively lesser saturation values of the electromagnet in the demagnetizing steps are brought about by decrease in the time interval for each step, or a decrease in the value of the voltage utilized in each step, and once the apparatus or system is predetermined according to its own law of operation, any change in the object being demagnetized does not alter the law of operation of the apparatus. This fact results in a disadvantage particularly in the case where work pieces of various masses are held by the chuck in which the electromagnet is embodied. In the present instance, the condition of the object itself being demagnetized, during the demagnetizing operation, controls the demagnetizing operation so that in each successive step the saturation level of the electromagnet is a certain proportion of that in the preceding step, regardless of the mass of the object being demagnetized, and without the requirement for any adjustment by the user for any change in the object being demagnetized.

Figure 1:
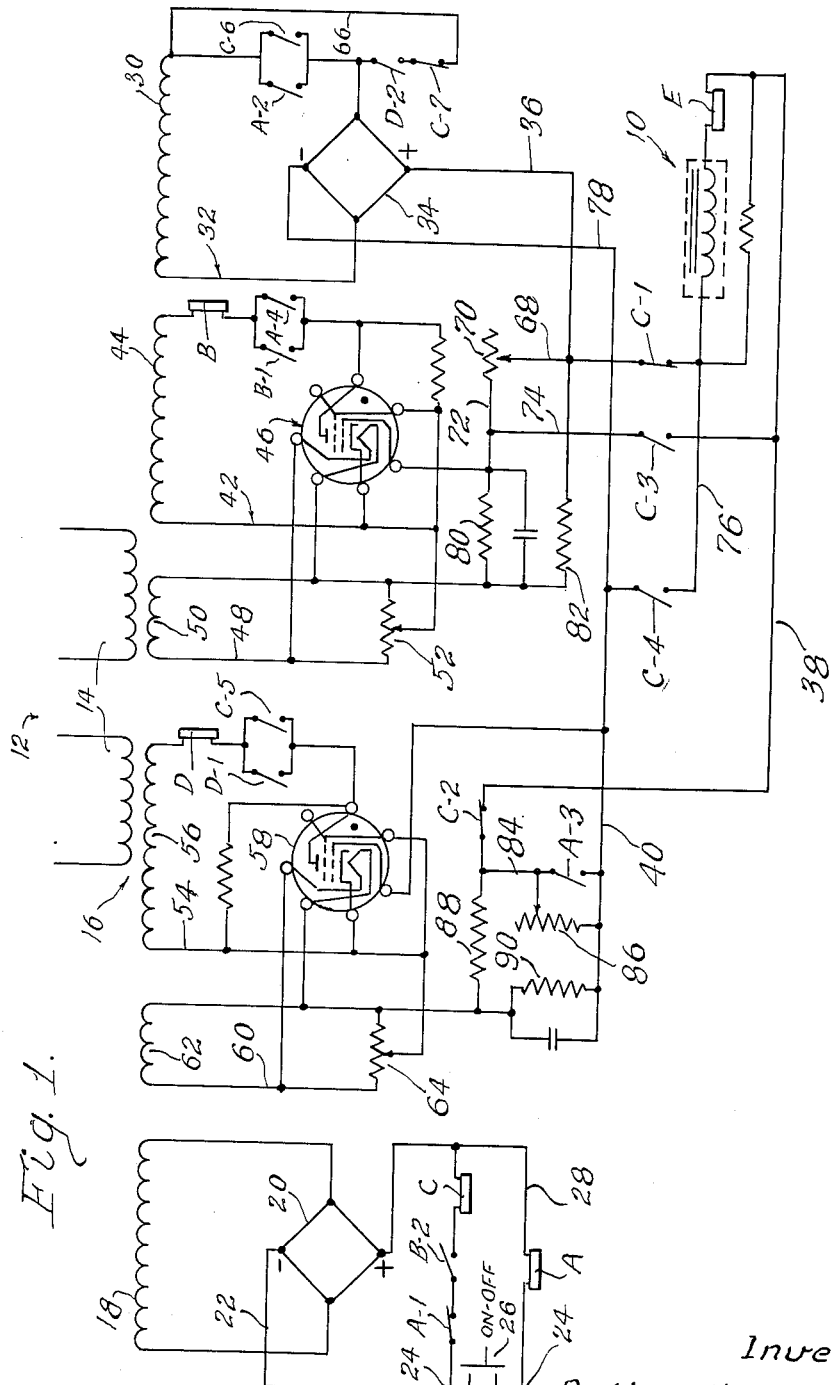
FIG. 1 is a circuit diagram utilized in one form of the invention.

Referring in detail to the circuit diagram of FIG. 1, an electromagnetic chuck, the object to be demagnetized, is indicated at 10. As will be understood by those skilled in the art, the electromagnetic chuck 10 may be embodied in any suitable machine tool such, for example, as illustrated in FIG. 1 of my prior Patent No. 2,825,854 mentioned above. As indicated in that patent, and as may be used as an example in the present case, the chuck is incorporated in the reciprocating table and is utilized for placement of a magnetic work piece thereon. Obviously the chuck 10, or an electromagnet to be demagnetized, may be incorporated in any of various kinds of apparatus, and it is not limited to the particular application referred to above.

In the circuit of FIG. 1, an A.C. source 12 is provided, of suitable voltage and including one or more primary coils 14 of a transformer 16. The transformer 16 includes a number of secondary coils, each of which will be referred to individually hereinbelow and one of which, 18, leads to a rectifier 20 embodied in a D.C. circuit 22 having contacts 24 closed by a suitable manually operated main on-off switch 26. In the operation of the device, the operator closes the switch 26 which controls operations resulting in energizing and magnetizing the chuck 10, this switch remaining closed in the normal operation of using the machine tool in which the chuck is incorporated. After completion of the operation on the work piece, such as grinding, milling, etc., the switch 26 is opened, and the circuit thereupon automatically demagnetizes in the manner described in detail hereinbelow.

The circuit 22 includes a conductor 28 having a relay A coil therein which controls normally closed switch A–1. Upon closure of the switch 26 the A coil is energized, which opens the switch A–1, and closes switch A–2 which energizes a circuit 32 including secondary coil 30 of the transformer 16, this circuit including also the switch A–2 and a power rectifier 34. Closure of the switch A–2 completes the circuit to the rectifier 34 and completes a D.C. circuit to the chuck 10 as follows: from the positive side, the conductor 36, normally closed switch C–1, the chuck, conductor 38, normally closed switch C–2, abnormally closed switch A–3, now closed by energization of the A coil, and conductor 40 in return to the negative side of the rectifier.

Energization of the A coil also closes switch A–4, in a circuit 42 which includes the secondary coil 44 of the transformer 16, relay B coil as well as a thyratron tube 46. Also included in this circuit is a switch B–1, in parallel with the switch A–4 for setting up a holding circuit for the B coil. Energization of the B coil, in response to closure of the switch A–4, immediately energizes the circuit 42 due to the normal conducting condition of the tube 46 which is established by circuit 48 which includes a secondary coil 50 of the transformer 16 and providing, through an adjustable potentiometer 52, a positive bias on the tube.

Energization of the B coil closes switch B–2 in the circuit 22 in series with the relay C coil associated with the C switches referred to above. The C coil, when energized under circumstances referred to hereinbelow, closes switches C–3 and C–4, and opens switch C–2.

The C coil is further associated with switch C–5 in a circuit 54, the latter, in addition to the switch C–5, including a secondary coil 56 of the transformer 16, relay D coil, and a thyratron tube 58. Included in the circuit 54 also is a switch D–1 in parallel with the switch C–5, serving to set up a holding circuit for the B coil.

The tube 58 also is normally in conductive condition, through circuit 60 which contains secondary coil 62 of the transformer 16 and an adjustable potentiometer 64 providing a positive bias on the tube. Hence, upon closure of the switch C–5, the circuit 54 is energized and held in energized condition until de-energized as explained hereinbelow.

Other switches include a switch C–6 in the circuit 32 in parallel with the switch A–2, a switch C–7 in a circuit 66, parallel with the switches A–2 and C–6, and a switch D–2 in series with the switch C–7.

As mentioned above, upon closure of the main on-off switch 26, the chuck 10 is energized for holding the work piece in position, and the system remains in stable condition for the working operation until the switch 26 is opened. Other portions of the system energized in this condition include of course the circuit 32, and the circuits 42 and 48. When completion of the working operation on the work piece is effected, and it is desired to demagnetize the chuck, the switch 26 is opened, and the apparatus automatically proceeds through its demagnetizing steps, namely, due to opening of the switch 26, the A coil is de-energized and the switch A–1 thereupon closes, setting up a circuit through the C coil which then becomes energized, the switch B–2 remaining closed due to the continued energization of the B coil through the holding circuit switch B–1.

Upon energization of the C coil, the switches C–1 and C–2 are opened while the switches C–3 and C–4 are closed. In this step the switch A–3 is also closed due to de-energization of the A coil.

These changes in the circuitry establish a reversal of the polarity of the direct current in the chuck 10, the circuit to the chuck being as follows: from the positive side of the rectifier 34, through the conductor 36, conductor 68, adjustable resistor or potentiometer 70, conductor 72, conductor 74, abnormally closed switch C–3, conductor 38 to the chuck 10, conductor 76, including abnormally closed switch C–4, and conductor 78 in return to the negative side of the rectifier.

Due to the reactance of the chuck 10 in this reversing step, a voltage is built up across the resistor 70 which is impressed as a negative bias on the tube 46, through the resistors 80 and 82. This build up of negative bias counters the positive bias provided by the circuit 48 and upon reaching a predetermined value the tube 46 becomes non-conducting.

The resistors 70, 80 and 82 are of certain values in relation to other resistors in connection with the tube 58 as explained hereinbelow. For example, the resistor 70 may be of 100 w. and 250 ohm value. By adjusting this resistor, the value of the negative bias may be adjusted, and hence the point at which the reversal step takes place adjusted. The resistor 80 may be, for example, of 25,000 ohm value while the resistor 82 may be of 75,000 ohm value.

Upon the tube 46 becoming non-conducting as explained, the B coil is de-energized and the holding circuit switch B–1 is opened. The switch A–4 having been previously opened, the circuit 42 is de-energized. Upon de-energization of the B coil, as just explained, the switch B–2 opens which deenergizes the C coil and that in turn allows the switch C–6 to open, and the switch A–2 associated therewith, having been previously opened, the circuit to the rectifier 34 is deenergized and the chuck also is de-energized.

However, in a previous step in which the C coil was energized, the switch C–5 in the circuit 54 was closed which energized the D coil which in turn closed the holding circuit switch D–1. The circuit 54, having been energized, remains energized despite the de-energization of the circuit 42, and the circuit 54 therefore is in condition for establishing the next demagnetizing step. Energization of the D coil closes the switch D–2, and the normally closed switch C–7 closes after de-energization of the C coil, and a circuit is again established to the rectifier 34. Furthermore the D.C. circuit to the chuck 10 is in its original polarity-direction due to closure of the switches C–1 and C–2. The switches A–3, C–3 and C–4 now being opened, the D.C. circuit to the chuck is as follows: from the positive side of the rectifier 34 through conductor 36, switch C–1, the chuck, conductor 38, switch C–2, conductor 84 adjustable resistor 86 and conductors 40 and 78 in return to the negative side of the rectifier. In this case, similarly to the situation explained above in connection with the tube 46, the reactance of the chuck 10 builds up a voltage across the adjustable resistor 86 which is impressed on the tube 58 through resistors 88 and 90, forming a negative bias. As this voltage builds up, and the consequent negative bias builds up, the positive bias provided by the circuit 60 is countered and the tube 58 becomes non-conducting. When the latter happens, the circuit 54 is broken and the D coil is de-energized and thus the circuit 54 de-energized. The entire circuitry is thus returned to its original condition, illustrated in the drawing.

The resistor 86 is of greater value than the resistor 70 being, for exampule, of 100 w., 500 ohm value, so as to render the tube 58 non-conducting at a lower saturation level of the chuck relative to the step associated to the tube 46. The resistors 88 and 90 may, for example, be of 100,000 ohm and 25,000 ohm values, respectively.

Thus, the saturation level of the electromagnetic chuck itself controls the operation or establishment of the respective demagnetizing steps. For example, if a work piece of relatively small mass is being held on the chuck, the saturation level thereof is reached relatively fast, while on the other hand when a work piece of relatively great mass is held on the chuck the desired or controlling saturation level is reached much slower and the controlling step by the tube 46 or 58 is effected after a longer interval. There is no need to attempt to match the condition of the object being demagnetized for the purpose of setting up a controlling circuit, but once the circuit is set up and made operative, it performs the demagnetizing steps in proportion to the condition of the object being demagnetized for any condition of object that may be utilized, i.e. of large or of small mass.

Instead of utilizing only two tubes, such as 46 and 58, it will be understood, of course, that any desired larger number may be utilized for establishing a greater number of steps, which result in lesser demagnetization in each size and consequent lesser saturation level in the final step.

An advantage of the invention will also be seen to reside in the fact that it is not necessary to pre-adjust a specific time cycle for the de-magnetizing step, since the time of each interval is determined by the saturation level of the chuck at every step in the demagnetizing operation.

If desired, another relay coil indicated at E may be interposed in the circuit in series with the chuck 10 for controlling other instrumentalities as desired, for example, one to be operated when the chuck is energized and magnetized, as the machine tool in which the chuck is incorporated.

Figure 2:
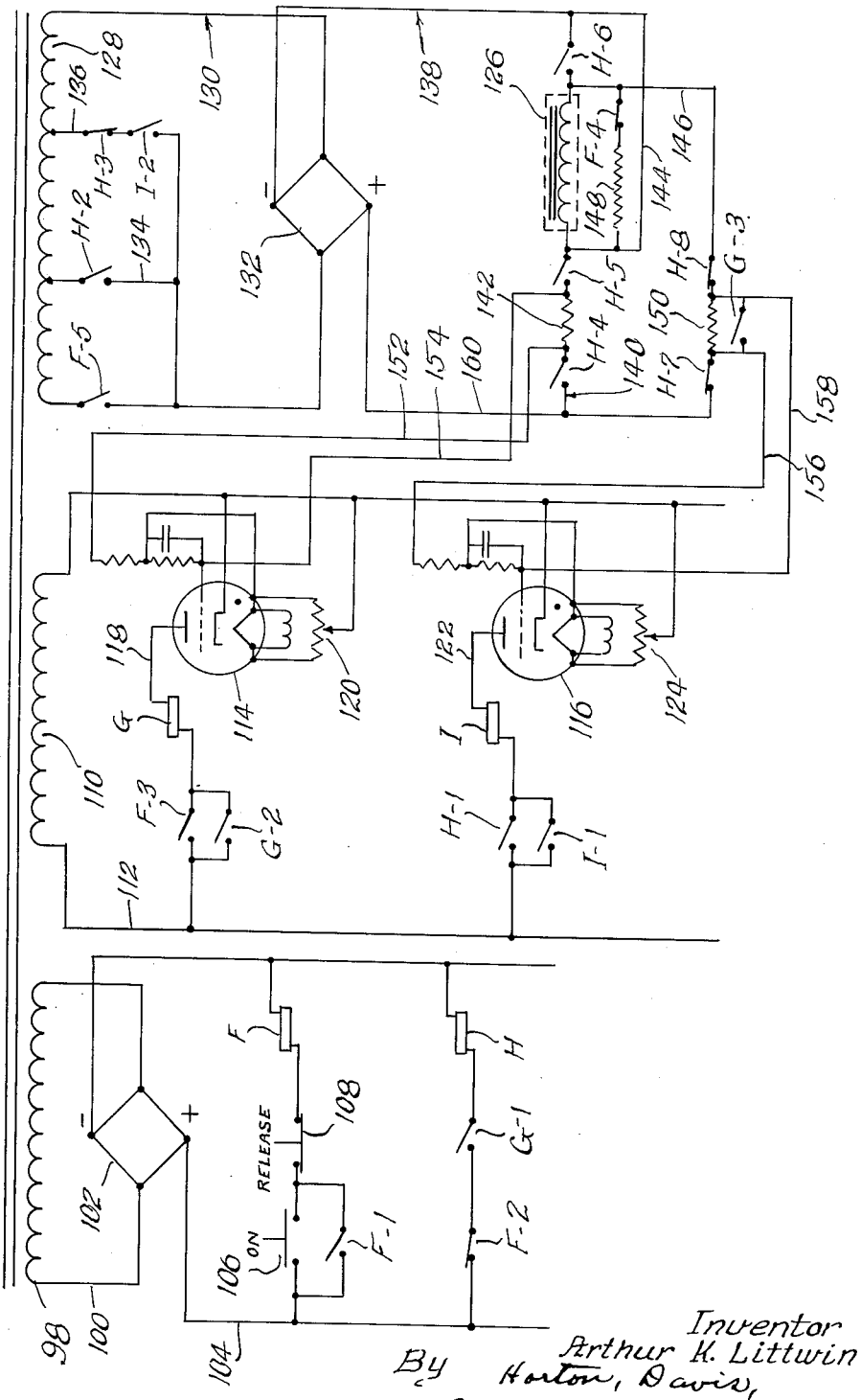
FIG. 2 is a circuit diagram of another form of the invention.

The foregoing embodiment of the invention utilizes the interposition of resistances of different values in the circuit at the respective steps of the demagnetizing operation for effecting the desired build up of voltage as controlled by the saturation level of the chuck. In the following embodiment as illustrated in the diagram of FIG. 2, the demagnetizing steps are controlled by imposing respectively different voltage values on the chuck in the respective steps of the demagnetizing operation. In both cases the condition of the chuck, namely the saturation level thereof, determines the interval of each step.

Referring in detail to the diagram of FIG. 2, a suitable source of alternating current is indicated at 94 having one or more primary coils in a transformer 96, one secondary coil of which, 98, is incorporated in a circuit 100 which also includes a rectifier 102. The latter is included in a D.C. circuit 104 which also includes a relay F coil in series with a main turn-on switch 106 and a release switch 108. Parallel with the switch 106 is a switch F–1 which serves to set up a holding circuit for the F coil. Also in the circuit 104, and parallel with the switches 106 and 108 and the F coil, are a relay H coil, a switch G–1 and a switch F–2.

Also included in the transformer 16 is a secondary coil 110 included in a circuit 112 which includes thyratron tubes 114, 116. Leading from the anode of the tube 114 is a conductor 118 having a relay G coil therein in series with a switch F–3. Parallel with the switch F–3 is a switch G–2 serving as a holding circuit switch for the G coil. The tube 114 is normally conducting, having a predetermined or fixed positive bias thereon. The positive bias may, however, be adjusted by means of a potentiometer 120.

The tube 116 is arranged similarly to the tube 114, having a conductor 122 leading from its anode, in which is included relay I coil as well as a switch H–1. Parallel with the switch H–1 is another switch I–1 serving to set up a holding circuit for the I coil. The tube 116 also is provided with a predetermined or fixed positive bias rendering the tube normally conducting, this positive bias, however, being adjustable by means of a potentiometer 124.

Another portion of the circuit, at the right end of FIG. 2 includes the electromagnetic chuck 126. This circuit portion includes a secondary coil 128 of the transformer 96 included in a circuit 130 which also includes rectifier 132 as well as a switch F–5. The circuit 130 further includes a normally open switch H–2 in a conductor 134 parallel with the switch F–5. Additionally, the circuit 130 includes another conductor 136 which includes switches H–3 and I–2, the latter two switches also being parallel with each of the switches H–2 and F–5.

The rectifier 132 is incorporated in a D.C. circuit 138 which directly includes the chuck 126. The chuck is included in a line indicated generally at 140 which includes in series switches H–4, H–5 and H–6, the chuck 126 and a resistor 142. The circuit 138 furthermore includes conductors 144 and 146 connected across the chuck and between which and parallel with the chuck is a resistor 148, the latter being in series with a switch F–4.

The conductor 146 also includes switches H–7 and H–8 together in series with a resistor 150. Connected to the line 140, across the resistor 142 are conductors 152 and 154 for providing negative bias to the grid of the tube 114, as explained more fully hereinbelow. Similarly, connected to the conductor 146, across the resistor 150 are conductors 156 and 158 for providing negative bias to the tube 116 also explained more fully hereinbelow. Connected across the conductors 156 and 158 is a switch G–3.

In the use of the apparatus made according to the diagram of FIG. 2 and for the purpose of energizing the chuck 126 for holding the work piece for the operation to be performed thereon such as milling, grinding, etc., the operator closes the main turn-on switch 106. This step performs several functions, one of which is to close switch F–5 which energizes the circuit 130 and hence the rectifier 132. The D.C. circuit 138 is closed to the chuck as follows: from the positive side of the rectifier, through conductor 160, conductor 146 having switches H–7 and H–8 and resistor 150 therein, the chuck, and through the conductor 144 in return to the negative side of the rectifier. The F coil in the circuit 104 closes the switch F–1 which establishes a holding circuit for the F coil, and so long as this condition remains the operation on the work piece may be performed, and it does so remain until the operator releases the circuit by opening the release switch 108.

Energization of the F coil closes switch F–3 and energizes the circuit to the G coil which in turn closes the switch G–2 for establishing a holding circuit. The tube 114 as indicated above is normally conducting and hence the circuit containing the tube is energized. This portion of the circuit 112 is inactive during the normal operation performed by the machine tool in which the chuck is incorporated, but it is set up for performing the first step in the demagnetizing operation when the latter operation is to be performed. After the working operation on the work piece is performed, the operator opens the release switch 108 which de-energizes the F coil, opening the switch F–1, but however, the relay G coil remains energized through the holding circuit switch G–2 notwithstanding the opening of the switch F–3. In the first step of the demagnetizing operation, the switch F–2 closes and, the switch G–1 having been previously closed, the H coil is energized which closes the switch H–2 and since the switch F–5 is open due to the de-energization of the F coil, the secondary coil 128 of the transformer is tapped through conductor 234, in bypassing relation to the switch F–5 and the circuit 130 is then energized at a voltage value less than that in the original circuit condition, and at a value corresponding to the point at which the conductor 134 is connected with the secondary coil.

In addition to the secondary coil being tapped at a different voltage value point, the D.C. circuit 136 through the chuck is reversed. In this step, the reversed polarity will be evident from the following D.C. circuit: from the positive side of the rectifier, through the conductor 160, through the line 140 in which all of the H switches are closed and in which the chuck is disposed, and through the conductor 138, in return to the negative side of the rectifier. The switches H–7 and H–8 are, of course, open. It may be noted at this point that in the reversing operation when the circuits 130 and 138 are de-energized, the switch F–4 closes due to the de-energization of the F coil which brought about the de-energization of these circuits. This operation places the resistor 148 across the chuck for discharging the counter E.M.F. voltage.

In this first step of the demagnetizing operation, the reactance of the chuck causes a build up of voltage across the resistor 142 and produces a negative bias on the tube 114. When this negative bias reaches the necessary and predetermined value, according to the value of the positive bias imposed on the tube, the tube becomes non-conducting and brings about various changes in the circuitry as follows: the G coil is de-energized which permits the switch G–1 to open and the H coil is thereby de-energized. This in turn opens the H–2 switch and closes the H–3 switch leading from the secondary coil 128. The de-energization of the H coil also opens the switch H–1 but the circuit including that switch and the I coil remains energized through the holding circuit switch I–1. At this step the switch I–2 closes, and the circuit 130 is established through the switches H–3 and I–2 while the switches H–2 and F–5 are open. The circuit is therefore energized at a still lesser voltage value point of the transformer and this lesser voltage is imposed on the chuck in this step of the demagnetizing operation. In this step the polarity of the voltage imposed on the chuck is in the same direction as in the original condition, according to the illustrated positions of the elements of the circuit in FIG. 2, i.e., from the positive side of the rectifier 132 through the conductor 160, conductor 146 which includes the switches H–7 and H–8, the chuck, and conductor 144 in return to the negative side of the rectifier. Thus, the polarity of the voltage is reversed and the value of the voltage is reduced in this step.

Further, in this step of the demagnetizing operation, the switch G–3 is open and the build up of voltage across the resistor 150 produces a negative bias on the tube 116 and, as described above in connection with the tube 114, when this negative bias reaches the necessary and predetermined value, it causes the tube 116 to cease conducting and the I coil becomes de-energized and the circuit returns to the condition illustrated in FIG. 2.

The embodiment of FIG. 2 just described utilizes, as pointed out above, different voltage value tappings of the supply transformer for effecting the desired voltage build up to cause the reversing operation which is in turn caused by the negative bias being imposed on the tubes according to the saturation level of the chuck which is the object being demagnetized. It will be understood that the adjustable resistors or potentiometers 120 and 124 are set to the desired values for causing the switching or reversing operation of the apparatus at the desired points, i.e., the tube 114 is set to produce a reversing operation at a higher saturation level than is the tube 116. Thus, in the final step of the demagnetizing operation the saturation level of the chuck is at the necessary low level as to enable the operator to easily remove the work piece from the chuck.

As described above in connection with the embodiment of FIG. 1 it is also true of the present embodiment of FIG. 2 that instead of utilizing only two tubes, a greater number may be utilized so as to produce a greater number of steps in the demagnetizing operation so that in the final step the saturation level of the chuck is at a relatively low value.

The two embodiments described above utilize a plurality of tubes for effecting the reversing steps in the demagnetizing operation. It is also within the compass of the present invention to utilize a single tube for bringing about this operation and such an arrangement is included in the embodiment of FIG. 3, the detailed description of which follows hereinbelow.

Referring in detail now to FIG. 3, a suitable A.C. source 162 is provided, including a primary coil 164 in a transformer 166 in which are included a plurality of secondary coils. One such secondary coil is indicated at 168 in a circuit 170 which includes a relay J coil as well as certain elements of the electron tube 172, a thyratron tube similarly to the previous embodiments described. Another secondary coil 174 of the transformer 166 reappears in the tube 172 and is utilized for heating the filament thereof.

Another secondary coil 176 of the transformer 166 is included in an A.C. circuit 178 with a rectifier 180, the latter being associated with a D.C. circuit 182 which includes one element 184a of a main on-off switch 184, the present switch element being ganged with another element 184b seen in the right hand portion of the diagram. The circuit 182 includes a condenser 186, and resistors 188 and 190 in parallel with the condenser. Connected in the circuit 182 between the resistors 188 and 190 is a conductor 192 leading to the indirectly heated filament of the tube. Connected across the resistor 190, in association with the conductor 192, is a conductor 194 which connects with a potentiometer or adjustable resistor 196 of the tube, the conductor 194 having another condenser 198 therein.

Another rectifier, indicated at 200, is connected in an A.C. circuit with a secondary transformer coil 202, and having a D.C. circuit including a conductor 204 connected to the circuit 182 through the conductor 206 thereof. The opposite D.C. portion of the circuit includes a conductor 208 connected with conductor 194, the D.C. conductors 204 and 208 being connected across the condenser 198.

The secondary coil 202, energizing the rectifier 200 is included in a transformer 210, the primary coil 212 of which is included in an A.C. circuit 214 with a secondary coil 216 of the transformer 166. The circuit 214 includes a snap-acting switch J–1. The circuit 214 is connected with a power rectifier 218.

Connected across the coil 212 are conductors 220 and 222 adapted in conjunction with the switch element 184b referred to above, for shorting the coil 212. The double-throw switch element 184b assumes a normal position as illustrated, engaging a contact in a conductor 224, and in its abnormally closed position engaging a contact in the conductor 222. The conductor 224 includes a resistor 226.

The rectifier 218 is included in a D.C. circuit 228 connected with the chuck which in the present instance is indicated at 230. The circuit 228 includes a conductor 232 leading from the positive side of the rectifier and has contacts 234 and 236. A conductor 238 leads from the negative side of the rectifier and has contacts 240, 242 therein. Associated with the contacts just mentioned are switch blades 244 and 246 in a conductor 248 which includes the chuck 230.

The switch blades 244 and 246 are arranged for reversing the polarity of the current imposed on the chuck and in the position illustrated engage contacts 234 and 242, respectively, while in the opposite position engage contacts 240 and 236, respectively, for reversing the polarity. The switch blades are ganged for operation in unison by means of a link 250 connected thereto and biased in one direction (to the left, FIG. 3) by a compression spring 252. The switch blades are actuated and moved in the opposite direction through a suitable instrumentality such as a rotary cam 254 engaged by a follower 256 on the link 250. The cam is rotated in step-by-step fashion by means of a reciprocating rod or rack 258 having a tooth 260 engageable with teeth 262 on the cam. The rod 258 is actuated by the J coil, the armature of which is indicated at J-2. Upon energization of the J coil, the rack 258 is actuated for moving the cam one step. In each step it is moved one-eighth of a revolution or such distance as to enable the follower 256 to engage consecutively the lobes 264 and the depressions 266 of the cam for alternately positioning the switch blades 244, 246 in opposite reversing positions. For example, with the follower 256 engaging the lobe the switch blades are positioned to the right as illustrated, and on the other hand when the follower engages in a depression 266, the switch blades are in the opposite position for relatively reversing the polarity of the current imposed on the chuck.

In the operation of the apparatus here illustrated and described the operator closes the switch 184, which results in closing switch element 184a and transferring switch element 184b. This step is performed for the purpose of energizing the electromagnet in the chuck 230 for holding the work piece thereon, and is left in such position during the operation performed on the work piece. With the switch element 184a and the switch element 184b transferred, the switch J-1 is closed which energizes the circuit 214 for energizing the power rectifier 218. Either direction of polarity imposed on the electromagnet may be assumed as a starting point, such as that illustrated, with the switch blades 244 and 246 positioned to the right and in contact with the corresponding contact elements 234, 242. The electromagnet or chuck is now energized and the working operation on the work piece is performed. During this operation the switch element 184b is in the position opposite to that shown, namely in the position shorting the coil 212.

Closure of the switch element 184a imposes a positive bias on the tube 172 which is therefore in conducting condition, and energizes the J coil and closes the switch J-1 referred to above. This condition also brings about the charging of the condenser 186 which remains charged until the demagnetizing operation is brought into play.

When the operator wishes to demagnetize the chuck, he opens the main switch 184, which opens the switch element 184a, de-energizing the circuit 182 leading from the rectifier 180 to the condenser 186. Condenser 186 is positively charged and upon de-energization of the circuit the charge is imposed on the tube 172 which continues the conducting condition of the tube. The opening of the switch 184 has the further effect, through the transfer of the switch element 184b to the position illustrated causes a surge in the primary coil 212 which is induced in the transformer 210 and transmitted to the rectifier 200. The rectifier 200 thereupon imposes a negative charge on the condenser 198 which is in opposition to the positive charge of the condenser 186. The charge built up in the condenser 198 progressively reaches an equivalent value and counters the effect of the condenser 186 and causes the tube 172 to be non-conducting. Thereupon the J coil becomes de-energized and the switch J-1 opens.

The charge on the condenser 198 thus set up progressively dissipates and the charge on the condenser 186 remains and again imposes a positive bias on the tube 172. This energizes the J coil and it performs two functions, one of which is again closing the switch J-1 and it also actuates the cam 254 through retraction of the rack 258 to rotate the cam one-eighth revolution so that the follower 256 engages in a depression 266. This results in the switch blades 244 and 246 assuming the position opposite to that illustrated and reversing the polarity of the current imposed on the chuck 230. The action of the cam in reversing the position of the switch blades takes place before the closing of the switch J-1, which is an important feature of the invention, the A.C. source being interrupted and during this period of interruption the D.C. switch is reversed. This results in elimination of arcing of the contacts in the D.C. circuit.

In this step of the demagnetizing operation, closing of the switch J-1 again causes a surge in the coil 212 which, as before, creates a surge in the rectifier 200 and imposes a negative charge on the condenser 198. This condenser again counters the positive charge on the condenser 186 and when it reaches the necessary value, the tube 174 again becomes non-conducting. The cycle has thus been completed and it repeats the cycle throughout the progress of the dissipation of the charge on the condenser 186. Throughout the course of the demagnetizing steps, the charge on the condenser 186 gradually diminishes and each time the condenser 198 becomes charged it need be charged only to a lesser extent because of the gradual diminishing of the charge on the condenser 186. Hence, the charge on the condensers at each reversing step becomes less and less with the result that each step is of shorter interval than the one before, resulting in a lesser saturation level in the chuck at each step.

In the present embodiment a single electron tube is utilized for producing the demagnetizing steps, through the instrumentality of the descending positive bias imposed thereon. The negative bias imposed on the condenser 198 is controlled by the condition of the chuck at each step in the demagnetizing operation, in accordance with the basic principles of the invention. As in the previous embodiments, the present arrangement is self adjusting, automatically adjusting itself to the impedance of the chuck as for example, when a small work piece is held on the chuck, the total mass is relatively small and the charge on the condenser 198 will build up faster than in the case of a large work piece with the result that the steps in the reversing and demagnetizing procedure take place at shorter intervals.

The embodiment of FIG. 4 is similar to that of FIG. 3 in that it utilizes a descending voltage value, and may be related to FIG. 3 for a description thereof. In the present embodiment, a common relay is indicated at 268 having counteracting coils K and L. The coil K may be placed in the circuit 182 in parallel with the condenser 186, in substitution of the tube 172 and related elements, while the coil L may be connected in the circuit 208, in substitution of the condenser 198, rectifier 200 and transformer 210. The coils act on an armature 270 which in turn acts on switch J-1 and armature J-2 of FIG. 3. Upon the charge on condenser 186 being imposed on the coil K, the latter is energized and the armature attracted, and upon build up of voltage across the coil L to the value corresponding to that of the coil K, the relay becomes deenergized and drops out. The reversal operation takes place as described in connection with FIG. 3, and the descending voltage across the coil K causes the several steps of demagnetization.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodimens thereof.

I claim:

1. Apparatus for demagnetizing an electromagnet comprising first circuit means for supplying alternating current, tube means in said first circuit, means for imposing a positive bias on the tube means for normally maintaining it conductive, means for converting the alternating current to direct current, second circuit means for transmitting the direct current to the electromagnet, reversing switch means in the second circuit means for reversing the polarity of the direct current, means responsive to the self-inductance of the electromagnet produced by opening said second circuit means for producing a negative bias proportional to the saturation level of the electromagnet and imposing it on the tube means in opposition to the positive bias thereon for rendering the tube means non-conducting, and means in said first circuit responsive to a non-conductive condition of the tube means for disabling the means for producing the negative bias.

2. Apparatus for demagnetizing an electromagnet comprising a source of direct current, a D.C. circuit for transmitting the direct current to the electromagnet, switch means in the D.C. circuit for reversing the polarity of the direct current, manually actuated means for maintaining and interrupting said D.C. circuit, a series of control circuits, an electron tube in each control circuit, means operated by each control circuit for interrupting said D.C. circuit and operating the reversing means at the periods of interruption of the circuit, a resistor in each control circuit, the resistors being of successively lesser values, and means including said resistor responsive to interruption of the D.C. circuit for producing a negative bias and imposing it on said tubes successively in opposition to the positive bias thereon for rendering the tubes non-conducting and operating said reversing means and re-establishing the D.C. circuit, said resistors being of successively different values.

3. Apparatus for demagnetizing an electromagnet comprising a source of direct current and a D.C. circuit for transmitting it to the electromagnet, means for reversing the polarity of the direct current, means in said D.C. circuit for establishing the direct current selectively at different voltage values, a control circuit including an electron tube therein, means normally maintaining a positive bias on the electron tube and maintaining it conducting, manually actuated means for interrupting said D.C. circuit, means for re-establishing said D.C. circuit at a lesser voltage value, and means responsive to self-inductance of the electromagnet upon de-energization thereof for producing a negative bias proportional to the saturation level of the electromagnet and imposing it on the electron tube in opposition to the positive bias for rendering the tube non-conducting.

4. Apparatus for demagnetizing an electromagnet comprising a source of direct current and a D.C. circuit for transmitting it to the electromagnet, an electron tube, a second circuit including said electron tube and including a first condenser, said second circuit being arranged for imposing a positive bias on the electron tube and rendering it conducting, said first condenser being arranged for imposing a positive bias on the electron tube upon de-energization of the second circuit, means for manually de-energizing said second circuit, and thereby de-energizing said D.C. circuit, and second condenser means charged in response to de-energization of said D.C. circuit arranged for imposing a negative bias on said electron tube in opposition to the positive bias imposed thereon to render it non-conducting, and means for reversing the polarity of the current on the electromagnet in response to de-energization of the second circuit, said second condenser means being charged in proportion to the saturation level of the electromagnet.

5. The method of demagnetizing an electromagnet comprising imposing a series of consecutively reversed-polarity magnetizations thereon and diminishing the magnetizations successively so that each magnetization is at a lower saturation level than the previous one, and utilizing the saturation level of each step for controlling and determining the saturation level at the next step.

6. The method of claim 5 wherein diminishing the magnetizations is effected by interposing resistances of different values in circuit for controlling the reversal of polarity of the voltage imposed on the electromagnet.

7. The method of claim 5 wherein diminishing the magnetizations is effected by tapping a source voltage at successively different value points and imposing correspondingly different value currents on the electromagnet.

8. The method of claim 5 wherein diminishing the magnetizations is effected by utilizing gradually diminishing voltage in circuit for controlling the reversal of polarity of the voltage imposed on the electromagnet.

9. Apparatus for demagnetizing an electromagnet comprising a source of direct current, circuit means for transmitting the direct current to the electromagnet and when closed operative for maintaining a predetermined saturation level on the electromagnet, relay means including reversing switches in said circuit means for reversing the polarity of the current imposed on the electromagnet, electronic tube means for controlling said relay means, means for maintaining a predetermined bias on said electronic tube means, means controlled by the saturation level of the electromagnet and operative in response to production of a predetermined saturation level, and opening of said circuit means, for producing an opposing bias on said electronic tube means equal to the first-mentioned bias for thereby operating the electronic tube means and hence actuating said relay means for reversing the polarity of the current in the electromagnet, and means for controlling the first-mentioned bias for limiting it to a value corresponding to an opposing bias produced by a predetermined level of saturation of the electromagnet, whereby to provide opposite polarity of the current in the electromagnet at a lesser saturation level.

10. The invention set out in claim 9 in which said electronic tube means includes a plurality of tubes whereby to provide a series of steps of reversals of polarity and of saturation levels.

11. The invention set out in claim 9 in which a resistor is provided in said circuit in series with the electromagnet, said resistor also being in series with said electronic tube means, whereby upon opening of said circuit the self-inductance of the electromagnet produces a voltage drop across said resistor which provides said opposing bias on said electronic tube means.

12. The invention set out in claim 9 in which a source of alternating current is provided, means is provided for converting the alternating current to direct current and delivering it to the electromagnet which includes said circuit means, and means is provided for interrupting the alternating current and reversing the direct current at intervals in which the alternating current is interrupted.

13. The invention set out in claim 12 in which the source of alternating current includes electronic tube means, and the last named means imposes on the electronic tube means a negative bias interruptedly in a series of steps for effecting the said interruption of the alternating current.

14. Apparatus for demagnetizing an electromagnet comprising a source of direct current, D.C. circuit means for transmitting the direct current to the electromagnet, relay means including switches in said D.C. circuit means for reversing the polarity of the current imposed on the electromagnet, means for initially interrupting said D.C. circuit means and de-energizing the electromagnet, and means controlled by the self-inductance of the electromagnet according to the saturation level thereof for operating said relay means and thereby reversing the polarity of the current in the electromagnet through a series of steps in which the saturation level of the electromagnet is reduced successively in said steps.

15. The apparatus of claim 14 in which the means controlled by the saturation level of the electromagnet includes a common relay with counteracting coils one of which is in said D.C. circuit means in series with the electromagnet.

16. Apparatus for demagnetizing an electromagnet comprising a source of alternating current including a transformer, an A.C. circuit including a plurality of tappings from the secondary of said transformer at successively lesser voltage value points, a D.C. circuit including the electromagnet and means for converting the alternating current to direct current and delivering it to the electromagnet, a resistor in said D.C. circuit in series with the electromagnet, a plurality of electronic tubes, a control circuit including said electronic tubes, means for normally maintaining a positive bias on said electronic tubes, means for reversing the polarity of the direct current, and manually activated relay means controlled by said electronic tubes for successively interrupting the A.C. circuit and connecting it at successively lesser value points, and actuating the reversing means during interruptions of the A.C. circuit, said relay means also including means for imposing negative bias on the electronic tubes seriatim, controlled by the voltage drop across said resistor in proportion to the saturation level of the electromagnet for rendering each nonconducting and enabling the successive one to effect connection with the respective tapping for energizing the electromagnet at successively lesser saturation levels.

References Cited in the file of this patent

UNITED STATES PATENTS

| | | |
|---|---|---|
| 2,648,033 | Hudson | Aug. 4, 1953 |
| 2,871,417 | Connoy | Jan. 27, 1959 |
| 2,946,932 | Littwin | July 26, 1960 |